US008601951B2

(12) United States Patent
Lerner

(10) Patent No.: US 8,601,951 B2
(45) Date of Patent: Dec. 10, 2013

(54) SELF-COOLING TROLLEY

(71) Applicant: Shawn Lerner, New York, NY (US)

(72) Inventor: Shawn Lerner, New York, NY (US)

(*) Notice: Subject to any disclaimer, the term of this patent is extended or adjusted under 35 U.S.C. 154(b) by 0 days.

(21) Appl. No.: 13/673,303

(22) Filed: Nov. 9, 2012

(65) Prior Publication Data

US 2013/0119690 A1  May 16, 2013

Related U.S. Application Data

(60) Provisional application No. 61/558,561, filed on Nov. 11, 2011.

(51) Int. Cl.
*B61C 13/00* (2006.01)
*B61B 7/00* (2006.01)

(52) U.S. Cl.
USPC .......................................... 105/150; 104/112

(58) Field of Classification Search
USPC ............ 104/89–93, 96, 106, 112–115, 173.1, 104/183; 105/148, 150
See application file for complete search history.

(56) References Cited

U.S. PATENT DOCUMENTS 4,185,562 A * 1/1980 Hatori et al. .................. 105/152
6,698,554 B2 * 3/2004 Desta et al. ................... 188/158

* cited by examiner

*Primary Examiner* — R. J. McCarry, Jr.
(74) *Attorney, Agent, or Firm* — Mintz, Levin, Cohn, Ferris, Glovsky and Popeo, P.C.

(57) ABSTRACT

A self-cooling trolley includes a wheel formed of a non-ferromagnetic material with a groove between two flanges disposed on a circumference. At least one pair of magnets are disposed in proximity to the wheel. Each pair of magnets comprises a north magnet with a north magnetic pole in proximity to the wheel and a south magnet with a south magnetic pole in proximity to the wheel. The at least one pair of magnets generate an eddy current within the rotating wheel opposing an angular motion of the wheel. Self-cooling means is provided on the wheel to generate an air flow toward and/or away from the wheel as the wheel rotates. Related methods are also described.

16 Claims, 3 Drawing Sheets

SELF-COOLING TROLLEY

CROSS-REFERENCE TO RELATED APPLICATION

This application claims the benefit of U.S. Provisional Patent Application No. 61/558,561, filed on Nov. 11, 2011, the content of which is incorporated herein by reference in its entirety.

TECHNICAL FIELD

The subject matter disclosed herein relates to trolley wheels and more particularly relates to self-cooling trolley wheel brakes.

BACKGROUND

Zip line trolleys must often significantly slow a rider. During the braking process, significant heat can be generated by the trolley wheel brake, which could impair the braking performance of the brake components. Furthermore, exposing the components of the trolley wheel to heat cycles (repeated heating and cooling) could reduce the overall performance of the trolley and increase wear of the components.

Thus, there is a need to provide an apparatus and method for cooling the trolley wheel during braking.

SUMMARY

Embodiments of the present subject matter relate to devices and methods for cooling trolley wheel brakes. Some embodiments of the present subject matter provide a self-cooling trolley comprising a wheel formed of a non-ferromagnetic metal. The wheel may include two flanges defining a groove therebetween for receiving a cable, at least one pair of magnets disposed in proximity to the wheel for generating an eddy current within the wheel to oppose an angular motion of the wheel as the wheel rotates, and self-cooling means disposed on the wheel for generating an airflow towards or away from the wheel as the wheel rotates to cool one or more components of the wheel. In some embodiments, each pair of magnets comprises a north magnet with a north magnetic pole in proximity to the wheel, and a south magnet with a south magnetic pole in proximity to the wheel.

In some embodiments, the self-cooling means may include one or more blades configured and arranged to generate the airflow. In some embodiments, the trolley may include a case housing the wheel. The case may include a vent, and the one or more blades may be configured and arranged to draw the airflow through the vent. In some embodiments, the vent may include one or more protruding edges to direct additional airflow into and/or out of the case. In some embodiments of the present subject matter, the wheel includes an anti-rollback bearing. In some embodiments, the wheel rotates on a shaft supporting an attachment point. The ends of the shaft may be secured to a case. In some embodiments, a plurality of the blades may be provided on two sides of the wheel.

In accordance with another aspect of the present subject matter, a method for self-cooling a trolley is provided. The method may include providing a wheel formed of a non-ferromagnetic material with a groove between two flanges disposed on a circumference; disposing at least one pair of magnets in proximity to the wheel, each pair of magnets including a north magnet with a north magnetic pole in proximity to the wheel, and a south magnet with a south magnetic pole in proximity to the wheel, the at least one pair of magnets generating an eddy current within the wheel as the wheel rotates to oppose an angular motion of the wheel; and providing self-cooling means on the wheel for generating an airflow towards or away from the wheel as the wheel rotates to cool one or more components of the wheel.

In some embodiments, the method further includes providing the self-cooling means with one or more blades configured and arranged to generate the airflow. The method may also include providing a case for housing the wheel. The case may be provided with one or more vents, and the one or more blades may be configured and arranged to draw the airflow through the one or more vents. In some embodiments, the vent may include a protruding edge to direct additional airflow into and/or out of the case. In some embodiments, the wheel may be provided with an anti-rollback bearing. In some embodiments, the wheel rotates on a shaft supporting an attachment point. The ends of the shaft may be secured to a case. In some embodiments, a plurality of the blades are provided on two sides of the wheel.

The subject matter described herein provides many advantages. For example, by cooling the trolley wheel and in particular its braking components, braking performance and overall trolley performance can be improved. Furthermore, reducing heat of the trolley wheel during braking could minimize heat cycles, reduce the maintenance required and/or increase the lifespan of the components.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

Like reference numerals in the various drawings indicate like elements.

DETAILED DESCRIPTION

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Trolleys are used to transport passengers and or other loads down cables. It is often necessary to slow the trolley over portions of the cable. Unfortunately, passengers often cannot be counted on to properly apply the brake(s) of a trolley in a timely manner. In addition, braking can often generate significant heat within the trolley that can impair the performance of trolley components. The embodiments described herein provide novel concepts relating to cooling trolley components during braking to counterbalance the significant heat generated by such braking.

Figure 1:
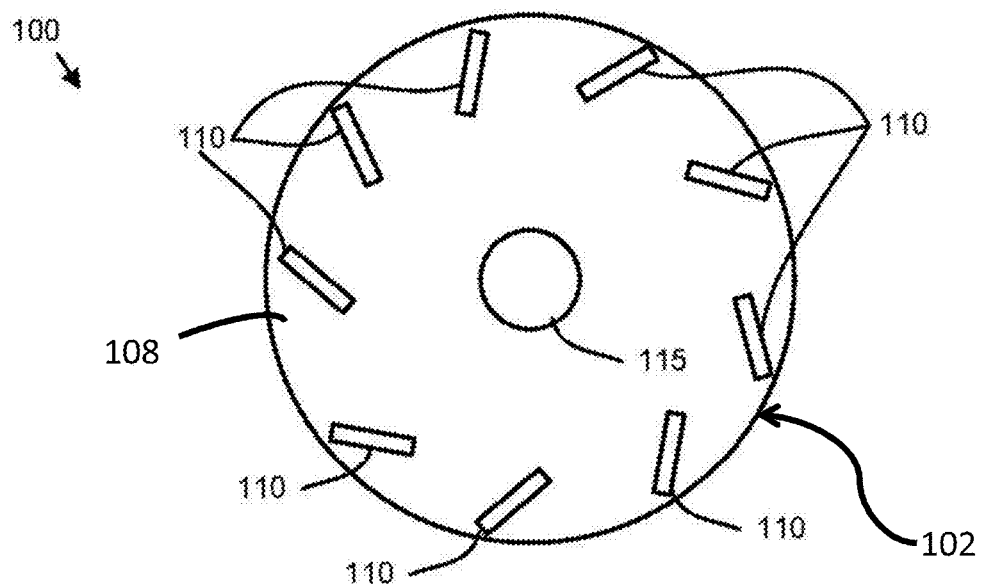
FIG. 1 is a side-view drawing illustrating an embodiment of a trolley wheel according to the present disclosure.

FIG. 1 is a side-view drawing illustrating an embodiment of a trolley wheel 100. In some embodiments, the wheel 100 may be formed of a non-ferromagnetic metal. In some embodiments, the wheel 100 may be specifically formed of aluminum. In some embodiments, the wheel 100 may be formed of a combination of one or more non-ferromagnetic metals and/or ferromagnetic metals. The wheel 100 may include a center bore fitted with a bearing 115, which in some embodiments, may be a one-way or anti-rollback bearing. In some embodiments, the wheel 100 may be configured generally like a pulley wheel, having a center spindle within which the bearing 115 fits and through which an axle (see FIG. 3) may engage to allow the wheel 100 to freely spin about the axle. As in shown FIG. 2, the wheel 100 may have a groove along its outer circumference to engage a rope, cable or zip line medium.

Figure 2:
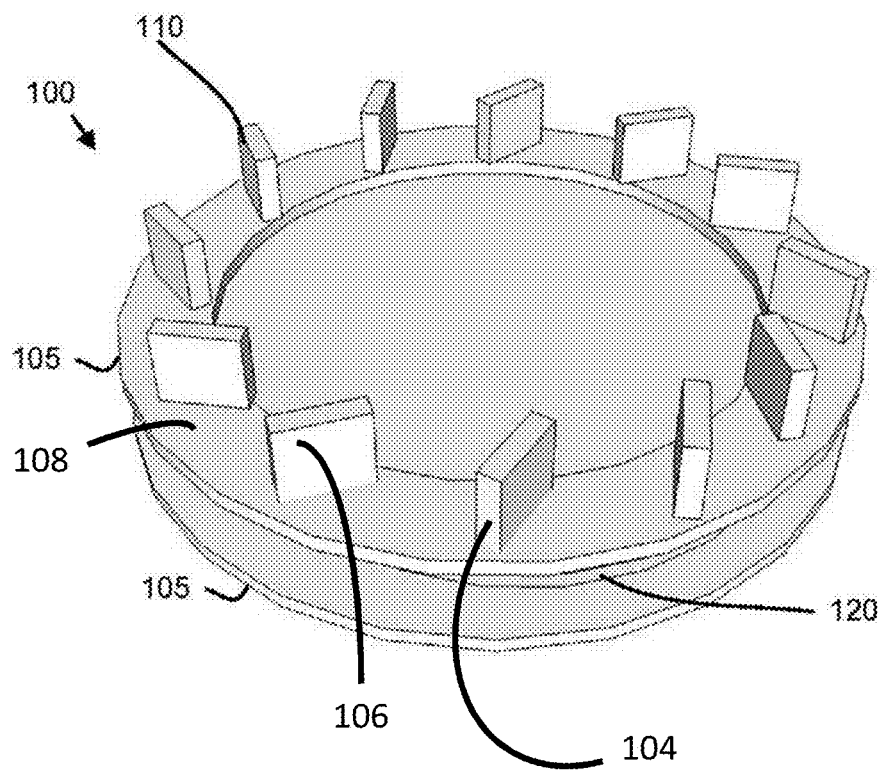
FIG. 2 is a perspective drawing illustrating an embodiment of a trolley wheel according to the present disclosure.

The wheel 100 according to some embodiments of the present disclosure may include one or more self-cooling means for cooling the wheel 100, bearing 115 and/or one or more other components of the trolley during braking. In some embodiments, the one or more self-cooling means may include one or more blades 110 disposed on the outside surface 108 of the wheel 100, as shown in FIG. 1. The blades 110 may be generally configured in a rectangular prism shape, with a short side 104 and a long side 106, as best seen in FIG. 2. In some embodiments, the blade 110 may extend upwardly and/or outwardly away from the surface of the wheel 100, also as best seen in FIG. 2. Some embodiments of the wheel 100 according to the present disclosure may be configured with one or more of the blades 110 that have rectangular prism shapes of all the same size and dimensions or blades 110 that have rectangular prism shapes of different sizes and dimensions. In some embodiments, the blades 110 may include different shapes, including prismatic shapes with curved edges, triangular shapes, propeller/wing shapes, and/or other shapes. In some embodiments, the shape(s) and/or one or more attributes of the blade(s) are selected to meet the desired cooling function of the present embodiments.

Embodiments of the present disclosure contemplate the blades 110 being constructed and arranged on the wheel to generate air flow in, around and generally toward the wheel 100 as the wheel 100 rotates about the axle. By generating or inducing air flows in, around and generally towards the wheel 100, the blades 110 cool the wheel 100, the bearing 115 and other components as will be described hereafter. In some embodiments, the one or more self-cooling means may be configured and arranged to move and/or direct air flow away from the wheel 100 so as to carry heat generated by braking action away from the components. In some embodiments, one or more blades 110 may be configured to draw air inwardly toward the wheel 100 and one or more blades 110 may be configured to direct air outwardly away from the wheel 100.

As can be seen in FIG. 1, the blades 110 may be disposed on the outside surface of the wheel 100 and along the circumference of the wheel 100 about the bearing 115, near a perimeter 102 of the wheel 100. In this embodiment, the blades 110 are spaced from one another and are arranged at an angle relative to the perimeter 102 of the wheel 100. In some embodiments, the blades 110 may be arranged at the same angle. In some embodiments, the one or more blades may be arranged at an angle different from an angle at which other blades 110 are arranged. Some embodiments of the wheel 100 according to the present disclosure may be configured with one or more of the blades 110 oriented such that the long side 106 of the blade 110 is substantially tangential to the perimeter 102 of the wheel 100. Some embodiments of the wheel 100 according to the present disclosure may be configured with one or more of the blades 110 oriented such that the short side 104 of the blade 110 is perpendicular to the perimeter 102 of the wheel 100. The angle of each and every blade 110 on the wheel 100 may be selected based on the cooling requirements for a particular wheel and/or trolley.

The number of blades 110 employed on a surface of the wheel 100 may also vary depending on the embodiment. As seen in FIG. 1, some embodiments may use eight blades. As seen in FIG. 2, some embodiments may include twelve blades. The number of blades 110 employed may be selected based on the cooling requirements for a particular wheel and/or trolley.

The angle of each blade 110 relative to the outside surface 108 of the wheel 100 may also be configured based on the cooling needs and requirements of a particular trolley. While the blades 110 depicted in FIG. 2 appear to be substantially perpendicular to the outside surface 108 of the wheel 100, other embodiments according to the present disclosure may include one or more blades 110 which are angled relative to the outside surface 108 of the wheel 100.

FIG. 2 is a perspective view of an embodiment of the wheel 100 according to some embodiments of the present disclosure. The wheel 100 may include a groove 120 between two flanges 105 of the wheel 100. The groove 120 may be rubberized, textured, or the like to grip a rope, cable or other zip line medium. The blades 110 may be disposed on the outside surface 108 of one or both flanges 105 of the wheel 100, depending on the embodiment.

Figure 3:
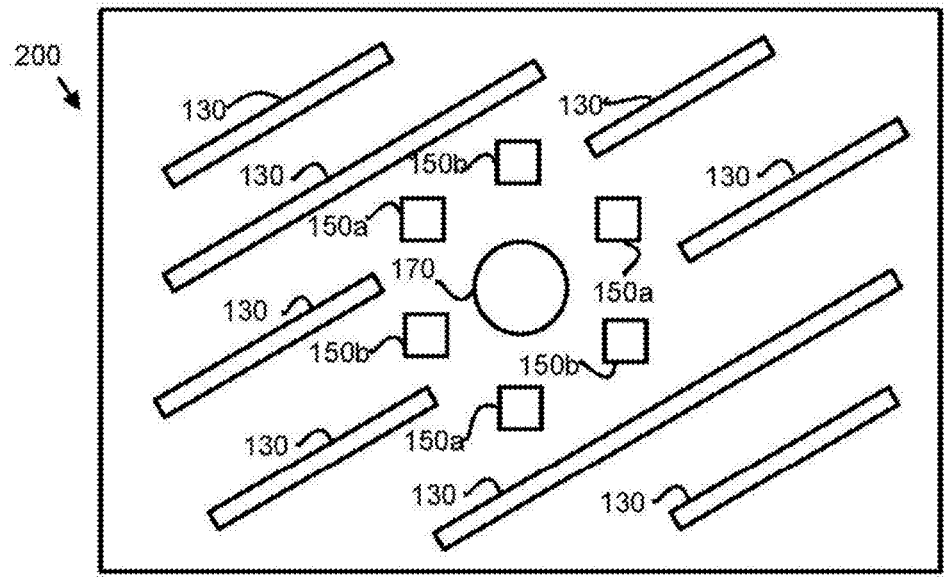
FIG. 3 is a side-view drawing illustrating an embodiment of a trolley wheel case according to the present disclosure.

FIG. 3 is a side-view drawing illustrating an embodiment of a side of a case 200. The case 200 may be comprised of any one or more appropriate materials and designed in any of one or more appropriate shapes so as to at least partially enclose one or more wheels 100 according to the present disclosure. Two or more sides may form the case 200.

Some embodiments of the case 200 may include at least one pair of magnets disposed in proximity to the wheel 100 when the wheel 100 is housed within the case 200. Each pair of magnets includes a north magnet 150a with a north magnetic pole in proximity to the wheel 100 and a south magnet 150*b* with a south magnetic pole in proximity to the wheel 100. The magnets may be configured and arranged to generate an eddy current about the wheel 100 as the wheel 100 rotates. The eddy currents are generated to oppose angular motion of the wheel 100 as the wheel 100 travels along a zip line.

Magnets may be selected to supply a specified braking force and, to this end, have specifications and/or characteristics (e.g., size, position, strength, etc.) that are tailored to achieve such specific braking force. For example, one pair of magnets of a specified strength may be mounted in the case 200 for a light load, while three pairs of magnets of the specified strength may be mounted in the case 200 for a heavy load. In some embodiments, larger or smaller magnets may be selected based on the desired braking force.

Figure 4:
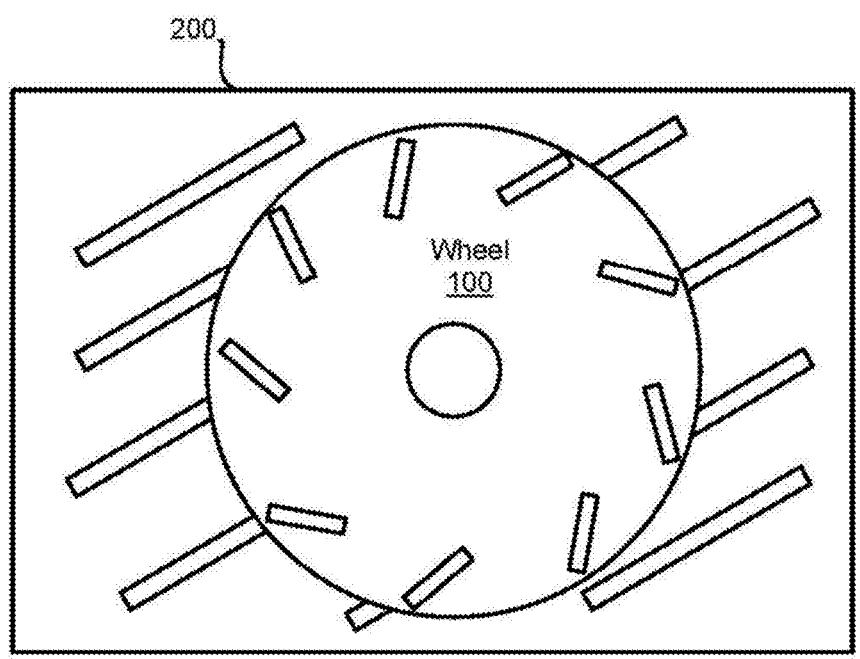
FIG. 4 is a side-view drawing illustrating an embodiment of a trolley wheel and a trolley wheel case according to the present disclosure.

The case 200 may include one or more vents 130. The vents 130 may be provided to enable the air flow generated by the self-cooling means (e.g., one or more blades 110) to cool the wheel 100 and the case 200. In some embodiments, one or more vents 130 may include a protruding edge (not shown) to direct additional air flow into the case 200 to cool the wheel(s) 100, the bearing(s) 115 and/or the case 200. While the vents 130 are shown in FIGS. 3 and 4 as elongated and rectangular in shape, the vents 130 could have other shapes, configured within the case 200 at a selected number of various angles and/or sizes (e.g., oval, circular, square, diamond, etc.). The case 200 could also contain numerous vents 130 or just a few. In some embodiments, the air vent configuration is selected based on the desired cooling needs and/or other parameters.

In some embodiments, an axle or shaft 170 may be in physical communication with the case 200 and bearing 115 of the wheel 100. The shaft 170 may be provided to support the bearing 115 and the wheel 100 within the case 200. In some embodiments, the shaft 170 may support and/or hold the case 200 together. The shaft 170 may be configured to carry heat away from the wheel 100 to the case to cool the wheel and/or other components. The air flow through the vents 130 can also be provided to cool the case 200 and enhance cooling.

FIG. 4 is a side-view drawing illustrating an embodiment of the trolley wheel 100 and case 200 according to the present disclosure. In some embodiments, such as the one depicted in FIG. 4, the wheel 100 may be supported by the shaft 170 within the case 200. The wheel 100 may be disposed with one or more pairs of magnets in proximity to the wheel 100. As the wheel 100 rotates, magnetic fields of the magnets may generate eddy currents within the wheel 100 to generate a braking force.

Figure 5:
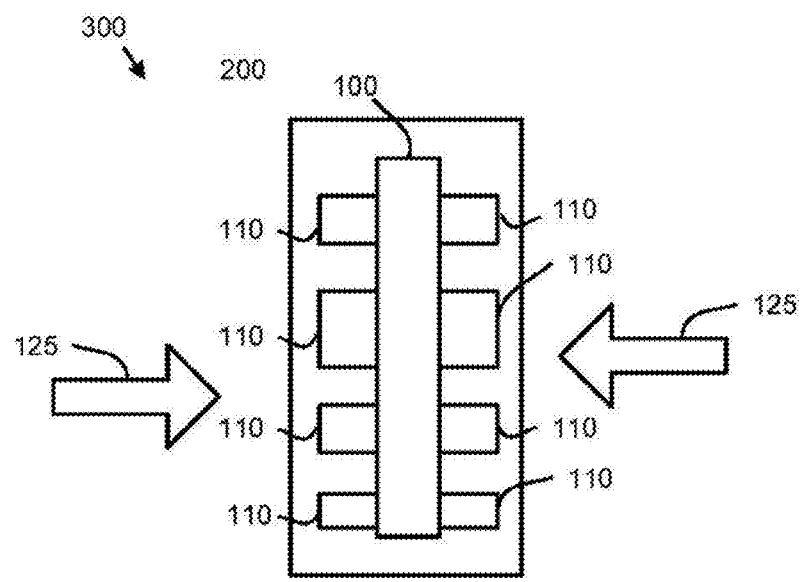
FIG. 5 is a top-view drawing illustrating an embodiment of a trolley wheel and a trolley wheel case according to the present disclosure.

FIG. 5 is a top-view drawing illustrating an embodiment of a trolley wheel 100 and case 200 according to the present disclosure. The blades 110 of the wheel 100 may induce an air flow 125 inwardly through the vents 130 of the case 200 to cool the wheel 100 as the wheel 100, the bearing 115 and the blades 110 rotating about an axis (e.g., shaft 170 in FIG. 3). In some embodiments, the blades 110 may induce air flows 125 inwardly from each side of the case 200 toward the wheel 100 as shown by the arrows in FIG. 5. In some embodiments, the blades 110 may motivate a first air flow 125 inwardly and a second air flow 125 on the opposite side of the case 200 outwardly thereby carrying away heat from the wheel 100. In some embodiments, the blades 110 may be configured to expel air outwardly on both sides of the wheel 100.

Figure 6:
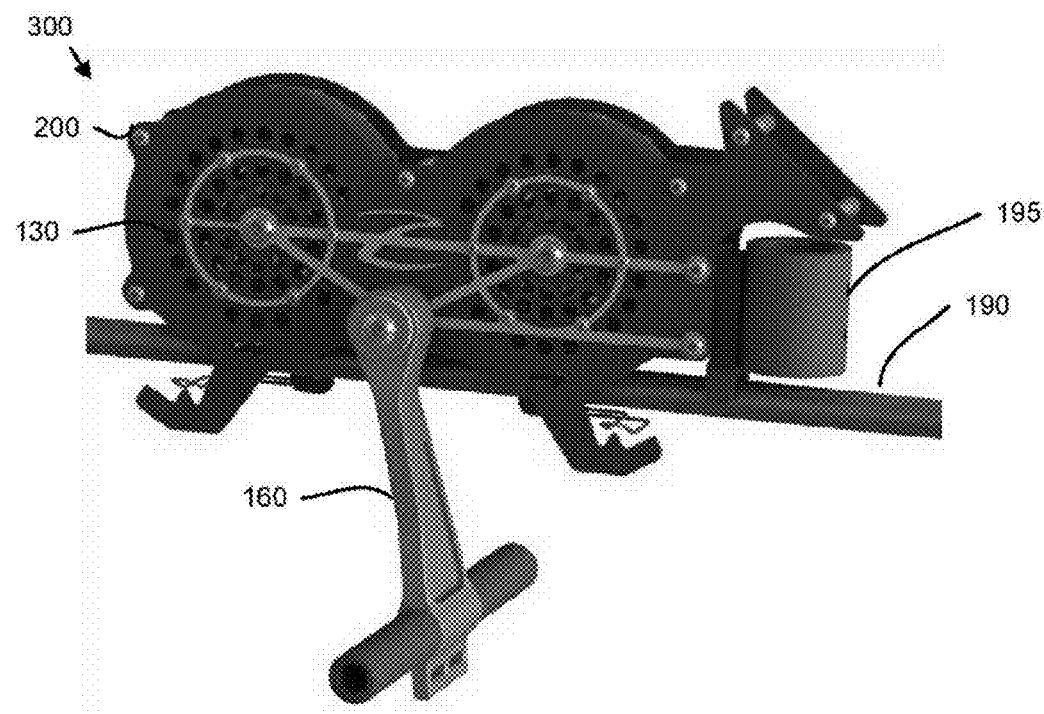
FIG. 6 is a perspective drawing illustrating an embodiment of a trolley according to the present disclosure.

Some embodiments of the trolley may include two wheels 100, as shown in FIG. 6 with respect to trolley 300. One of skill in the art will recognize that embodiments may be practiced with any number of wheels 100. The attachment point 160 is in physical communication with the case 200. In one embodiment, the attachment point 160 may be supported by the shaft 170. The grooves 120 of the wheels 100 fit on the cable 190. The wheels 100 rotate as the trolley 300 travels along the cable 190. The magnets 150 and the wheel 100 function as an eddy current brake that slows the motion of the trolley 300. The blades 110 direct air flows 125 to the wheel 100 to carry away heat generated by the eddy currents.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A self-cooling trolley comprising:
a housing having a first side, a second side substantially parallel to the first side, one or more vents formed in each of the first side and the second side and at lease one pair of magnets disposed on and within the housing, wherein:
each pair of the at least one pair of magnets includes a first magnet having a north magnetic pole and a second magnet having a south magnetic pole, and
the first magnet is arranged on an inside surface of the first side of the housing and the second magnet is arranged opposite the first magnet on an inside surface of the second side of the housing;
and
at least one wheel being rotatably engaged with and positioned at least partially within the housing, being formed of one or more non-ferromagnetic metals and having a first outside surface including a first flange, a second outside surface including a second flange and one or more cooling blades disposed on each of the first outside surface and the second outside surface, wherein:
the first flange and the second flange define a groove therebetween for receiving a cable and
the one or more cooling blades generate airflow inwardly and/or outwardly through the one or more vents upon the at least one wheel being rotated,
wherein the first magnet and the second magnet of the at least one pair of magnets are disposed within the housing adjacent the at least one wheel and configured to generate eddy currents about the at least one wheel to oppose the rotation of the at least one wheel.

2. The self-cooling trolley according to claim 1, wherein the one or more cooling blades are configured on the first outside surface and the second outside surface to draw airflow inwardly through the one or more vents on the first side and the second side of the housing.

3. The self-cooling trolley according to claim 1, wherein at least one of the one or more vents includes a protruding edge to direct additional airflow into the housing.

4. The self-cooling trolley according to claim 1, wherein the at least one wheel includes an anti-rollback bearing.

5. The self-cooling trolley according to claim 1, wherein the at least one wheel rotates about a shaft in physical communication with the housing at an attachment point.

6. The self-cooling trolley according to claim 1, wherein the one or more cooling blades are configured on the first outside surface and the second outside surface to draw airflow inwardly through one or more vents on the first side of the housing and motivate airflow outwardly through one or more vents on the second side of the housing.

7. The self-cooling trolley according to claim 1, wherein the one or more cooling blades are configured on the first outside surface and the second outside surface to motivate airflow outwardly through the one or more vents on the first side and the second side of the housing.

8. The self-cooling trolley according to claim 1, wherein the number of pairs of magnets provided on and within the housing dictates the amount of braking force applied to the at least one wheel.

9. The self-cooling trolley according to claim 1, wherein the number and arrangement of the one or more cooling blades on each of the first outside surface and the second outside surface of the at least one wheel dictates the degree of cooling imparted by the one or more cooling blades.

10. A method for cooling a trolley, comprising:
providing a housing having a first side, a second side substantially parallel to the first side, one or more vents formed in each of the first side and the second side and at least one pair of magnets disposed on and within the housing, wherein:
each pair of the at least one pair of magnets includes a first magnet having a north magnetic pole and a second magnet having a south magnetic pole, and
the first magnet is arranged on an inside surface of the first side of the housing and the second magnet is arranged opposite the first magnet on an inside surface of the second side of the housing; and
providing at least one wheel being rotatably engaged with and positioned at least partially within the housing, being formed of one or more non-ferromagnetic metals and having a first outside surface including a first flange, a second outside surface including a second flange and one or more cooling blades disposed on each of the first outside surface and the second outside surface, wherein:
the first flange and the second flange defined a groove therebetween for receiving a cable and
the one or more cooling blades generate airflow inwardly and/or outwardly through the one or more vents upon the at least one wheel being rotated,
wherein the first magnet and the second magnet of the at least one pair of magnets are disposed within the housing adjacent the at least one wheel and configured to generate eddy currents about the at least one wheel to oppose the rotation of the at least one wheel.

11. The method according to claim 10, further comprising drawing airflow inwardly through the one or more vents on the first side and the second side of the housing.

12. The method according to claim 10, wherein at least one of the one or more vents includes one or more protruding edges to direct additional airflow into the housing.

13. The method according to claim 10, wherein the at least one wheel includes an anti-rollback bearing.

14. The method according to claim 10, wherein the at least one wheel rotates about a shaft in physical communication with the housing at an attachment point.

15. The method according to claim 10, furthering comprising drawing airflow inwardly through one or more vents on the first side of the housing and motivating airflow outwardly through one or more vents on the second side of the housing.

16. The method according to claim 10, further comprising motivating airflow outwardly through the one or more vents on the first side and the second side of the housing.

* * * * *